Aug. 9, 1955
J. C. OGLE, JR
2,714,835
REVERSIBLE REAR VIEW MIRROR
Original Filed July 16, 1949
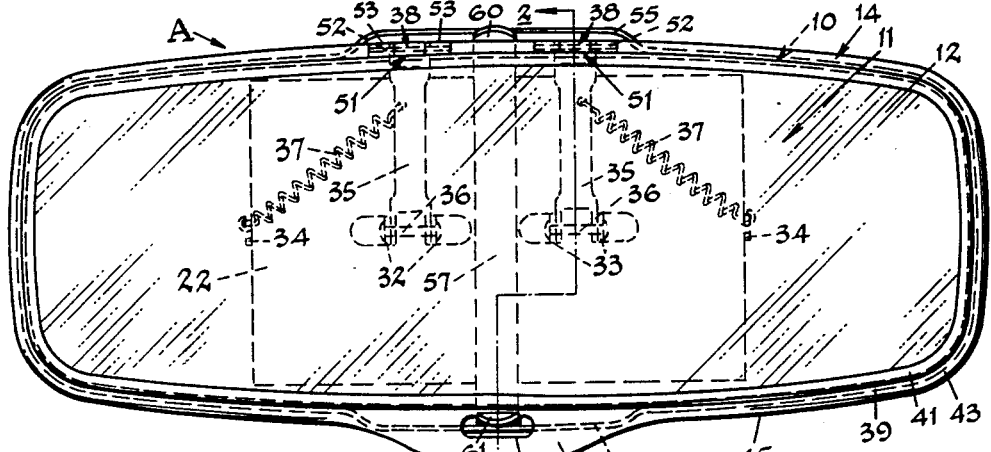
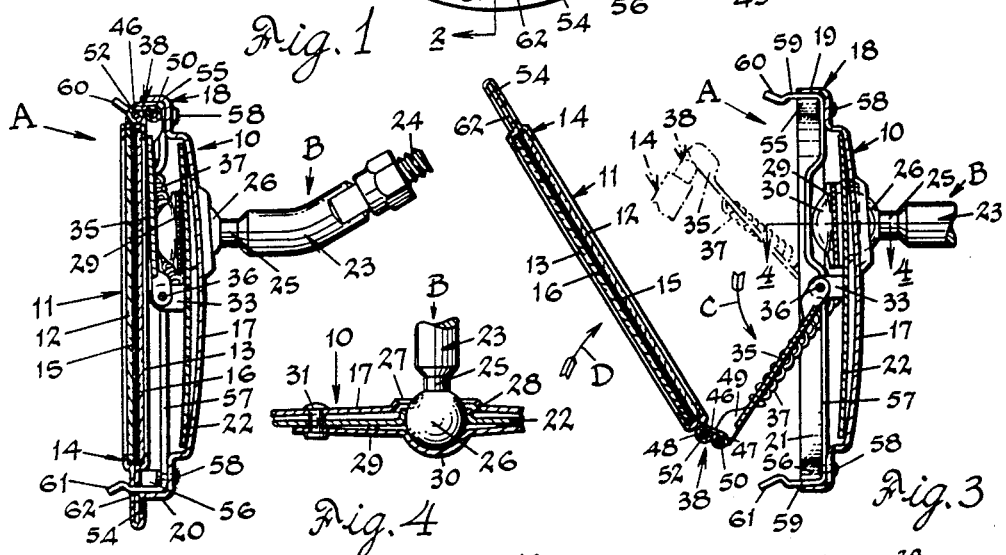
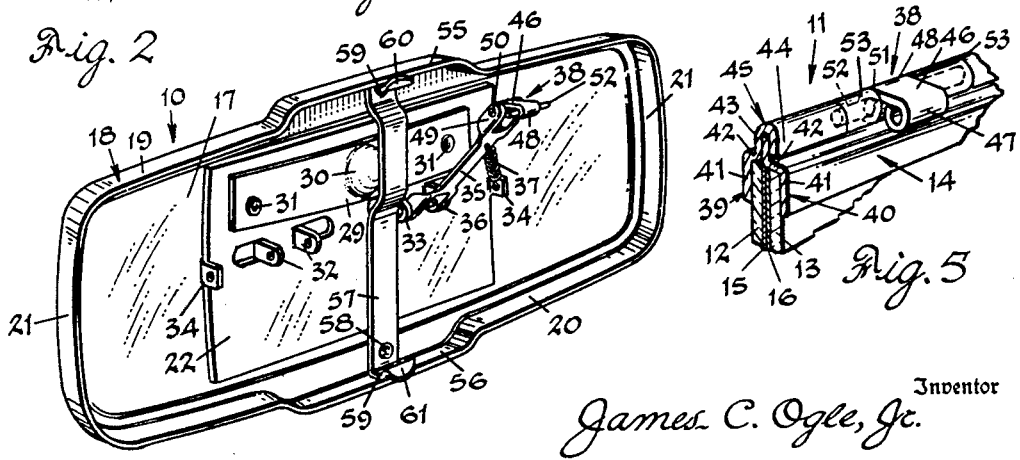
Inventor
James C. Ogle, Jr.
By
Nobbe & Swope
Attorneys United States Patent Office 2,714,835
Patented Aug. 9, 1955

2,714,835

REVERSIBLE REAR VIEW MIRROR

James C. Ogle, Jr., Tarentum, Pa., assignor to Libbey-Owens-Ford Glass Company, Toledo, Ohio, a corporation of Ohio Continuation of abandoned application Serial No. 105,151, July 16, 1949. This application September 23, 1953, Serial No. 381,792

5 Claims. (Cl. 88—77)

This invention relates to improvements in rear view mirrors such as are used in automobiles and the like.

This application is a continuation of my copending application Serial No. 105,151, filed July 16, 1949, now abandoned.

The primary purpose in the use of a rear view automobile mirror is of course to provide the driver with a satisfactory view of the rear road conditions under the various conditions of driving. The present invention has to do with a special type of reversible rear view mirror having two oppositely facing, reflecting surfaces of different reflective power, either of which can be selectively brought into operative viewing position by the driver of the automobile. The mirror thus presents for day driving a highly reflective surface affording clear vision of rear road conditions and for night driving provides a surface of relatively lower reflectivity for determining the location and proximity of other cars behind the driver without glare annoyance and dangerous distraction from their headlights.

More particularly, the invention resides in the provision of a rear view mirror of the above character embodying means of a novel and improved character which will enable the driver to effect reversal of the mirror in a rapid, efficient manner and with a minimum of care and attention on his part.

Another object of the invention is the provision of such a rear view mirror embodying a supporting case with which the mirror proper is associated for bodily rotatable movement whereby it can be readily reversed to selectively bring either of the reflecting surfaces into the line of vision of the driver, depending upon whether the mirror is to be used for day driving or night driving.

Another object of the invention is the provision of a rear view mirror assembly embodying a supporting case upon which the mirror unit is hingedly mounted, the several parts of the assembly being so associated with each other as to provide a simple, compact arrangement which may be easily actuated by the driver of the vehicle to withdraw the mirror unit from the case, reverse the reflecting surfaces thereof, and return the mirror unit to operative position with reference to the case.

A further object of the invention is the provision of a rear view mirror assembly embodying a case, the front of which is open, and a hingedly mounted reversible mirror unit closing the front of the case when in normal operative position and rotatable with respect thereto during reversal of the reflecting surfaces, with means being provided to effectively maintain the mirror unit in normal viewing position, whereby either the day driving or night driving mirror surface can be selectively brought into the line of vision of the driver without requiring his visual attention or otherwise diverting his attention from the road.

A still further object of the invention is the provision of a rear view mirror assembly of the above character in combination with means for supporting the same upon the structure of the vehicle for bodily adjustment relative to its supporting structure to bring the mirror unit into any desired angular position to accommodate persons of different height and seating position.

Other objects and advantages of the invention will become more apparent during the course of the following description, when taken in connection with the accompanying drawings.

In the drawings, wherein like numerals are employed to designate like parts throughout the same:

Fig. 1 is a front elevation of a rear view mirror constructed in accordance with the invention;

Fig. 2 is a vertical transverse section taken substantially on line 2—2 of Fig. 1;

Fig. 3 is a similar vertical transverse section but showing the mirror unit in partially reversed position;

Fig. 4 is a horizontal detail section taken substantially on line 4—4 of Fig. 3;

Fig. 5 is a fragmentary perspective view of the hinge support for the mirror unit;

Fig. 6 is a perspective view of the interior of the supporting case showing a portion of the means for supporting the mirror unit.

With reference to the drawing, the letter A designates in its entirety a rear view mirror constructed in accordance with the invention. The mirror assembly A comprises generally a case 10, adjustably supported within an automobile or the like by a mounting means B, and carrying a reversible mirror unit 11.

Although the invention is not limited to the use of any specific type of reversible mirror unit 11, it may be composed as herein shown by way of example, of two mirror elements 12 and 13 arranged in back to back relation and mounted in a bezel 14. The mirror elements 12 and 13 may have their inner, adjacent surfaces provided with reflective coatings 15 and 16 respectively, of different reflecting values, with one mirror coating being highly reflecting and suitable for daytime driving and the other mirror coating having a relatively lower reflecting value suitable for night time driving. For the night driving surface, the reflecting surface of a piece of black glass might be employed and a suitable other mirrored glass employed for day driving. The mirror unit 11 is hingedly associated with the case 10 in such a manner that the driver of the vehicle may selectively bring either the mirror element 12 or 13 into operative viewing position in his line of vision.

The case 10 is substantially rectangular in outline and comprises a rear wall 17 preferably arcuately shaped through both its longitudinal and transverse axes and a forwardly directed peripheral flange 18 defining a top wall 19, bottom wall 20, and opposite end walls 21.

Carried by the rear wall 17 of the case is a back plate 22 to which the mirror unit 11 is hingedly connected in a manner to be more fully hereinafter described. The plate 22 also constitutes a part of the mounting means B for securing the mirror assembly to the framing structure of an automobile or the like.

The mounting means B, herein shown, constitutes but one form of adjustable mounting which may be used for this purpose and the invention is not limited thereto. As illustrated, however, such means comprises an arm 23 which is secured to the framing structure of an automobile by means of its threaded end 24. Opposite this threaded end portion, the arm 23 is provided with a shank 25 of reduced diameter that terminates in a spherical or ball end 26. The shank 25 of the arm extends through an opening 27 in the rear wall 17 of the case, and the ball end 26 is mounted in a spherical bearing or seat 28 formed in the plate 22. The ball end is retained in said seat by a spring metal strap 29 having a spherical bearing portion 30 conforming to and engaging said ball. The strap 29 is secured at its opposite ends against the plate 22 by rivets or the like 31, said rivets also extending through the rear wall 17 of the case and thereby rigidly interconnecting the strap 29 and plate 22 to the case 10 as shown in Fig. 4. The bearing portion 30 of the strap 29 coacts with the seat 28 on plate 22 to grip the ball end 26 of the arm 23 with sufficient force to maintain the mirror assembly A stationary except when it is adjusted bodily by the driver upon the said ball.

The back plate 22 is provided with two pairs of forwardly directed tabs 32 and 33 which are struck from the body of the plate, while similar tabs 34 are arranged at the opposite ends of said plate. The tabs 32, 33 and 34 are in alignment with one another and are positioned along the horizontal center axis of the case. Carried by the pairs of tabs 32 and 33 are the inner ends of arms 35 which are pivoted thereto by pins 36. The arms 35 are normally urged inwardly to a position substantially parallel with the back plate 22 by coil springs 37 connected at one end to said arms and at their opposite ends to the tabs 34 at the respective ends of the back plate. The arms 35 are pivotally connected at their outer ends to the bezel 14 of the mirror unit 11 by double hinges 38 which permit reversal of the mirror unit as it pivots upon the tabs 32 and 33 as will be more fully hereinafter described.

The bezel 14 of the mirror unit comprises a pair of relatively thin complementary frame sections 39 and 40 which fit around the edges of the mirror elements 12 and 13. Each frame section comprises a relatively narrow facing strip 41 contacting the outer surface of the respective mirror element and having formed integral therewith an inturned web portion 42 disposed opposite the edge of the mirror unit and terminating in an outwardly directed tongue 43. One of said tongues, for example the tongue 43 of frame section 39, is spun or folded over the tongue of frame section 40, as indicated at 44, to form a bead 45 extending around the periphery of the mirror unit.

Each double hinge 38 comprises a relatively short link 46 having similarly rolled ends 47 and 48. As illustrated, the rolled end 47 of the link is received between the bifurcated outer end 49 of the respective arm 35 and is pivotally connected thereto by a pintle 50. The opposite ends of the links are received in notches 51 cut in the bead 45 of the bezel 14 and are pivoted thereto by pintles 52. These pintles extend beyond the links at opposite ends thereof and the extended end portions thereof are secured by sections 53 formed from the overlapping tongue 44 of frame section 39 and spun or rolled over the ends of the pintles to secure them against displacement.

Along the side of the bezel 14, opposite the hinges 38 and intermediate the ends thereof, the marginal edges of the frame sections 39 and 40 are increased in width to form a finger grip 54.

In the rear view mirror assembly herein provided, the mirror unit 11 substantially closes the open front of the case 10 when in its normal operative position. At such time, the bead 45 of the bezel is in abutting relation and supported against the outer edge of the peripheral flange 18 of the case to present a neat attractive appearance and prevent vibration in use. To accommodate the free ends of the arms 35 and the hinges 38 when the mirror is in operative position, the top wall 19 and bottom wall 20 of peripheral flange 18 are shaped in their central portions to form enlarged housing portions 55 and 56.

Disposed vertically and centrally within the case 10 is a metal strip 57 secured to the rear wall 17 by rivets or the like 58. The opposite ends 59 of metal strip 57 are received within the housings 55 and 56 and are suitably bent forwardly to provide upper and lower snap catches 60 and 61 which will resiliently engage the bead 45 of the bezel when the mirror unit is in its operative position. The finger grip 54 has an opening 62 therein to receive the snap catches 60 and 61 and which will snap over an edge of the opening and effectively retain the mirror unit against accidental displacement from either of its operative positions.

In operation, and assuming the mirror unit 11 is disposed with the mirror element 12 presented to the driver as shown in Fig. 2, and the driver desires to reverse said unit to bring the mirror element 13 into viewing position, it is simply necessary for him to grasp the finger grip 54 and pull forwardly thereon to release the mirror unit from the snap catch 61. When this is done, the driver continues to swing the lower portion of the mirror unit forwardly whereupon the top thereof will be released from the catch 60 and the arms 35 caused to revolve in a counter-clockwise direction about the axes of the pins 36 and against the tension of the springs 37 as shown in broken lines in Fig. 3 and as indicated by the arrow C. Substantially simultaneously, the mirror unit will swing upon the pintles 52 in a clockwise direction as indicated by the arrow D. When the arms 35 pass beyond the horizontal in their downward movement, the springs 37 will act to effect a positive pull upon said arms to draw them downwardly into substantial alignment with the back plate 22 and the hinge 38 into the housing 56 where it will be engaged by the snap catch 61. Simultaneously, the mirror unit will assume the full line position in Fig. 3 and the upper end of the mirror unit will then be pushed inwardly until the snap catch 60 engages the peripheral bead 45 of the mirror unit. This will bring the mirror element 13 into the line of vision of the driver.

To again reverse the positions of the mirror elements 12 and 13 to return the mirror element 12 to viewing position, the operator will grasp and pull forwardly and downwardly upon the finger grip 54 to release the upper end of the unit from the snap catch 60. As the mirror unit swings downwardly and outwardly upon the hinge 38, the lower end thereof will be released from the catch 61 and the arms 35 caused to swing upwardly in a clockwise direction as shown in full lines in Fig. 3. By substantially simultaneously turning the mirror unit in a counter-clockwise direction upon hinge 38 and applying an upward thrust thereto, the arms 35 will be swung upwardly as indicated in broken lines, while the mirror unit is urged inwardly until it is received within the case and engaged at its top and bottom by the snap catches 60 and 61. Here again, as the arms 35 pass beyond the horizontal in their upward movement, the springs 37 will automatically act to snap the arms rearwardly and facilitate reversal of the mirror unit.

Although the construction herein disclosed includes two arms 35 and associated parts, it will be appreciated that in some instances a single arm located at the center of the case may be used. Likewise, it is contemplated that the two arms 35 may be connected together to swing as a unit.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a rear view mirror for automobiles and the like, a substantially rectangular supporting case including a rear wall provided with mounting means for said case, an arm pivotally supported by the rear wall of the case between the top and bottom and inwardly of the opposite ends thereof for swinging movement upwardly and downwardly about a horizontal axis, a mirror unit normally closing the front of the case and having two oppositely facing reflective surfaces of different reflecting values, and a double hinge connecting an edge of the mirror unit intermediate its opposite ends to said arm for swinging movement upwardly and downwardly with respect thereto so that upon swinging of the arm 180° in one direction the mirror unit may be simultaneously swung 180° in the opposite direction to effect the reversal of said mirror unit relative to said case to present the desired reflecting surface to the driver.

2. In a rear view mirror for automobiles and the like, a substantially rectangular supporting case open at the front thereof and including a rear wall provided with mounting means for said case and a forwardly directed peripheral flange, an arm pivotally mounted at its inner end upon the rear wall of the case between the top and bottom thereof and also intermediate its ends for swinging movement upwardly and downwardly about a horizontal axis, a mirror unit normally closing the front of the case and having two oppositely facing reflective surfaces of different reflecting values, a double hinge connecting one edge of the mirror unit intermediate its opposite ends to the outer end of said arm to provide for swinging movement of said mirror unit upwardly and downwardly so that upon swinging of the arm 180° in one direction the mirror unit may be simultaneously swung 180° in the opposite direction to effect the reversal of said mirror unit and present the desired reflecting surface to the driver, means at the opposite edge of said mirror unit to facilitate the reversal thereof by the driver, and means carried by the case and engaging the opposite edges of the mirror unit for maintaining the said mirror unit in normally closed position with respect to the case.

3. In a rear view mirror for automobiles and the like, a substantially rectangular supporting case open at the front thereof and including a rear wall provided with mounting means for said case and a forwardly directed peripheral flange, an arm pivotally mounted at its inner end upon the rear wall of the case between the top and bottom thereof and also intermediate its ends for swinging movement upwardly and downwardly about a horizontal axis, a mirror unit normally closing the front of the case and including a supporting bezel and two oppositely facing reflective surfaces of different reflecting values, and a double hinge comprising a link pivoted at one end to the outer end on said arm and at its opposite end to one edge of the bezel of the mirror unit to provide for swinging movement of said mirror unit upwardly and downwardly so that upon swinging of the arm 180° in one direction the mirror unit may be simultaneously swung 180° in the opposite direction to effect the reversal of said mirror unit and present the desired reflecting surface to the driver.

4. In a rear view mirror for automobiles and the like, a substantially rectangular supporting case open at the front thereof and including a rear wall provided with mounting means for said case and a forwardly directed peripheral flange, an arm pivotally mounted at its inner end upon the rear wall of the case between the top and bottom thereof and also intermediate its ends for swinging movement upwardly and downwardly about a horizontal axis, a mirror unit normally closing the front of the case and including a supporting bezel and two oppositely facing reflective surfaces of different reflecting values, a double hinge comprising a link pivoted at one end to the outer end of said arm and at its opposite end to one edge of the bezel of the mirror unit to provide for swinging movement of said mirror unit upwardly and downwardly so that upon swinging of the arm 180° in one direction the mirror unit may be simultaneously swung 180° in the opposite direction to effect the reversal of said mirror unit and present the desired reflecting surface to the driver, a finger grip at the opposite edge of the bezel having an opening therein, and means carried by said case and received in said opening in engagement with said bezel to maintain the said mirror unit in normally closed position with respect to the case.

5. In a rear view mirror for automobiles and the like, a substantially rectangular supporting case open at the front thereof and including a rear wall provided with mounting means for said case and a forwardly directed peripheral flange, an arm pivotally mounted at its inner end upon the rear wall of the case between the top and bottom thereof and also intermediate its ends for swinging movement upwardly and downwardly about a horizontal axis, a mirror unit normally closing the front of the case and including a supporting bezel and two oppositely facing reflective surfaces of different reflecting values, a double hinge comprising a link pivoted at one end to the outer end of said arm and at its opposite end to one side of the bezel of the mirror unit to provide for swinging movement of said mirror unit upwardly and downwardly so that upon swinging of the arm in one direction the mirror unit may be simultaneously swung in the opposite direction to effect the reversal of said mirror unit and present the desired reflecting surface to the driver, and a tension spring connected at one end to said arm and at its opposite end to the rear wall of the case for resisting the outward movement of the said arm and acting to normally draw it inwardly into the case.

No references cited.

The following references are of record in the parent file of this patent:

UNITED STATES PATENTS

| 988,024 | Pelletier | Mar. 28, 1911 |
| 1,486,534 | Munn | Mar. 11, 1924 |
| 1,557,605 | O'Meara | Oct. 20, 1925 |
| 1,558,471 | Goertz | Oct. 27, 1925 |
| 1,594,147 | Barrows | July 27, 1926 |
| 1,817,766 | Rhodes | Aug. 4, 1931 |
| 1,876,319 | Smith | Sept. 6, 1932 |
| 2,123,400 | Murphy | July 12, 1938 |
| 2,136,625 | Lasko | Nov. 15, 1938 |
| 2,307,532 | Murphy | Jan. 5, 1943 |

FOREIGN PATENTS

| 45,410 | France | May 20, 1935 |
| | (Addition to No. 771,551) | |